United States Patent
Palmer et al.

(10) Patent No.: US 11,699,941 B2
(45) Date of Patent: Jul. 11, 2023

(54) METHOD AND APPARATUS FOR PROVIDING MOTOR WITH SHAFT GROUND

(71) Applicant: Nidec Motor Corporation, St. Louis, MO (US)

(72) Inventors: Steven R. Palmer, Highland, IL (US); Jeffrey Scott Sherman, Creve Coeur, MO (US); Chuck Roessler, St. Louis, MO (US); Mark C. Dierkes, O'Fallon, MO (US)

(73) Assignee: Nidec Motor Corporation, St. Louis, MO (US)

( * ) Notice: Subject to any disclaimer, the term of this patent is extended or adjusted under 35 U.S.C. 154(b) by 490 days.

(21) Appl. No.: 17/002,510

(22) Filed: Aug. 25, 2020

(65) Prior Publication Data
US 2022/0069677 A1 Mar. 3, 2022

(51) Int. Cl.
*H02K 11/40* (2016.01)
*H02K 5/173* (2006.01)
*H02K 5/22* (2006.01)

(52) U.S. Cl.
CPC ............. *H02K 11/40* (2016.01); *H02K 5/225* (2013.01); *H02K 5/1732* (2013.01)

(58) Field of Classification Search
CPC ............ H02K 5/15; H02K 5/16; H02K 5/161; H02K 5/173; H02K 5/1732; H02K 5/22;
(Continued)

(56) References Cited

U.S. PATENT DOCUMENTS 5,343,101 A * 8/1994 Matani ..................... H02K 9/06
310/58
2010/0001602 A1* 1/2010 Bossaller ............... H02K 11/40
29/596

(Continued)

FOREIGN PATENT DOCUMENTS

CN 202978550 U * 6/2013
JP 6653605 B2 * 2/2020

OTHER PUBLICATIONS

Miki, machine translation of JP6653605, Feb. 2020 (Year: 2020).*
Kong, machine translation of CN202978550, Jun. 2013 (Year: 2013).*

*Primary Examiner* — Eric Johnson
(74) *Attorney, Agent, or Firm* — Hovey Williams LLP

(57) ABSTRACT

A method of electrically grounding a rotor shaft of an electric motor includes removing a first lockplate fastener from a motor endshield and an internal bearing lockplate. A second lockplate fastener remains coupled to the motor endshield and internal bearing lockplate such that the internal bearing lockplate stays secured along an interior side of the motor endshield. A mounting plate of a shaft ground assembly is positioned along an exterior side of the motor endshield. The mounting plate supports a shaft ground that includes a conductive element configured to electrically couple to the rotor shaft. The first lockplate fastener is replaced with a first mounting plate fastener coupled to the mounting plate, motor endshield, and bearing lockplate to secure the mounting plate to the endshield and to secure the bearing lockplate along the interior side of the motor endshield.

20 Claims, 10 Drawing Sheets

(58) Field of Classification Search
CPC .......... H02K 5/225; H02K 7/003; H02K 7/08;
H02K 7/083; H02K 11/40; H02K
15/0006; F16C 41/002
See application file for complete search history.

(56) References Cited

U.S. PATENT DOCUMENTS

2016/0372987 A1* 12/2016 Tejano ................... H02K 11/40
2018/0241275 A1*  8/2018 Zhi ........................ H02K 5/161

* cited by examiner

METHOD AND APPARATUS FOR PROVIDING MOTOR WITH SHAFT GROUND

BACKGROUND

The embodiments described herein relate generally to an electric motor, and more particularly, to an electric motor having a bearing lockplate supporting an output shaft ground assembly.

Electric motors are used in various household, office, automotive, and industrial applications. Electric motors typically include a rotor surrounded by a stator. The stator generally consists of an electromagnet. When electrical energy is supplied to the stator, a magnetic field is generated. The magnetic field produces a torque that rotates the rotor. The rotor typically includes an output shaft that connects to an output device, such as a fan, belt, pully, gear, etc. Electric motors can be used in a number of orientations, including a vertical orientation.

A vertically mounted electric motor is one in which the output shaft is oriented vertically to enable the output shaft to be coupled to an output device positioned above or below the electric motor. During operation of an electric motor, the rotating components of the motor generate vibrations. An electric motor and housing system has a resonance frequency, which is a function, in part, of the mass of the electric motor and the distribution of the mass. If the frequency of the generated vibrations of the electric motor is close to or the same as the resonance frequency of the electric motor, the vibrations are amplified, potentially resulting in mechanical issues with the motor. For example, in a vertically mounted electric motor, amplified vibrations can cause one or more of the output shaft bearings to move, potentially becoming unseated from its respective bearing pocket.

In addition, variable frequency drives (VFD) used on some electric motors induce electrical currents in the output shaft of the electric motor. The induced electrical current seeks a path of least resistance to ground, which is typically through the output shaft bearings. These electrical currents result in arcing between bearings and bearing races. Such arcing over a period of time causes pitting in the output shaft bearings. The pitted/damaged bearings causes noise, vibration, and premature bearing failure.

SUMMARY

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

In one aspect, a method of electrically grounding a rotor shaft of an electric motor is provided. The method includes removing a first lockplate fastener from a motor endshield and an internal bearing lockplate while a second lockplate fastener remains coupled to the motor endshield and internal bearing lockplate such that the internal bearing lockplate stays secured along an interior side of the motor endshield. The method also includes positioning a mounting plate of a shaft ground assembly along an exterior side of the motor endshield. The mounting plate supports a shaft ground. The shaft ground includes a conductive element configured to electrically couple to the rotor shaft. Furthermore, the method includes replacing the first lockplate fastener with a first mounting plate fastener coupled to the mounting plate, motor endshield, and bearing lockplate to thereby secure the mounting plate along the exterior side of the endshield and to secure the bearing lockplate along the interior side of the motor endshield.

In another aspect, a grounding kit for electrically grounding a rotor shaft of an electric motor is provided. The electric motor includes an internal bearing lockplate coupled to an endshield by a removable lockplate fastener. The lockplate fastener extends through a fastener hole defined between interior and exterior sides of the endshield. In addition, the lockplate fastener threadably engages the bearing lockplate. The grounding kit includes a mounting plate configured to be secured along the exterior side of the endshield. The mounting plate includes a shaft relief portion and a fastener opening located outboard of the shaft relief portion. The shaft relief portion is configured to receive the rotor shaft. Moreover, the fastener opening is configured to align with the fastener hole when the mounting plate is secured along the exterior side of the endshield. The grounding kit also includes a shaft ground coupled to the mounting plate. The shaft ground includes a conductive element configured to electrically couple to the rotor shaft when the mounting plate is secured along the exterior side of the endshield. Furthermore, the grounding kit includes a mounting plate fastener having a fastener head and a threaded fastener shaft. The mounting plate fastener serves to replace the lockplate fastener, with the fastener shaft received in the fastener opening and the fastener hole and threadably engaged with the bearing lockplate, when the mounting plate is secured along the exterior side of the endshield.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
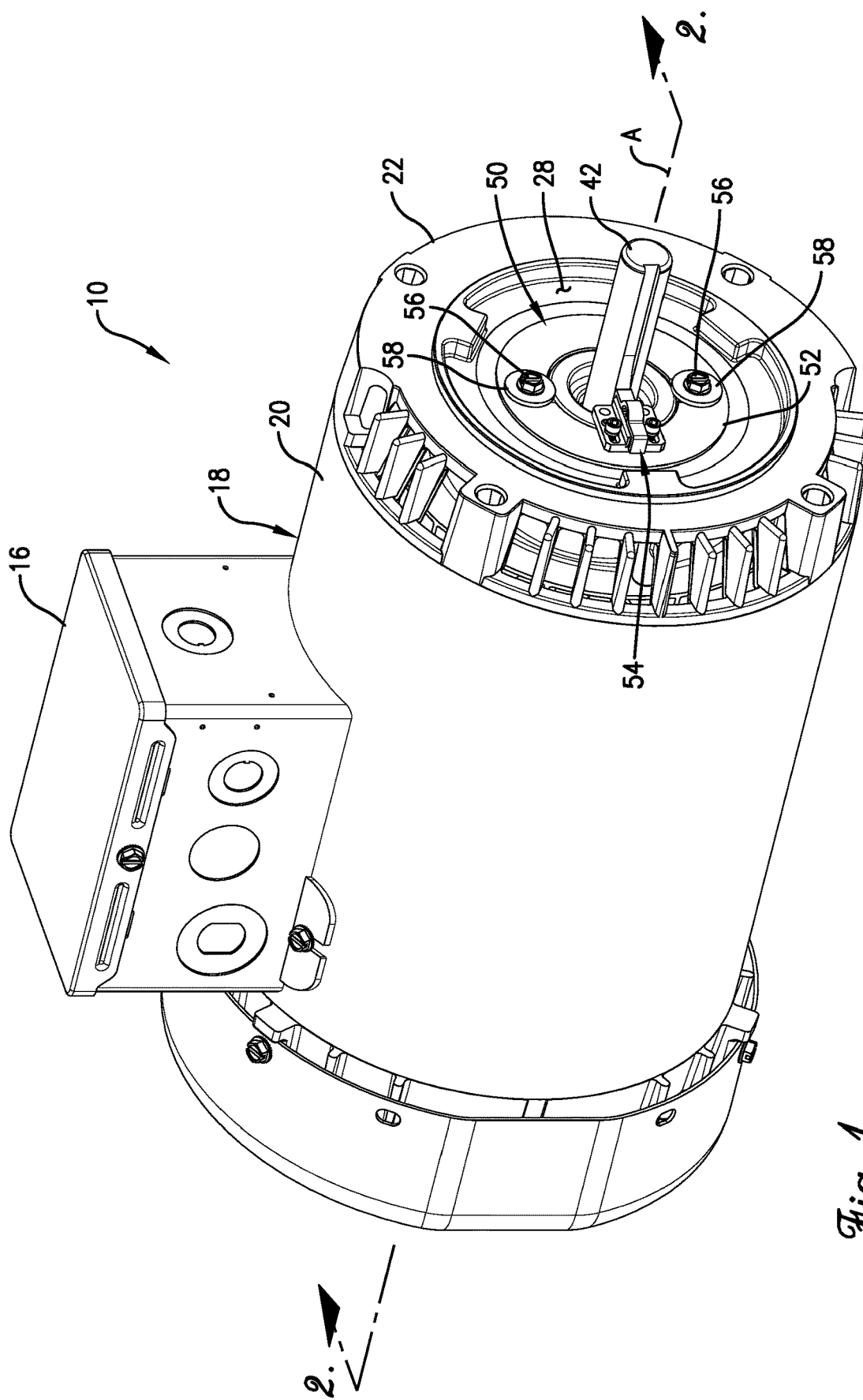
FIG. 1 is a perspective view of an exemplary electric motor having a shaft ground assembly coupled thereto, in accordance with one aspect of the present invention.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein. While the drawings do not necessarily provide exact dimensions or tolerances for the illustrated components or structures, the drawings are to scale with respect to the relationships between the components of the structures illustrated in the drawings.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made, without departing from the scope of the claims. The following description is, therefore, not limiting. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be clear to those skilled in the art from the description. For example, a feature, structure, act, etc. described in one embodiment may also be included in other embodiments but is not necessarily included. Thus, the present technology can include a variety of combinations and/or integrations of the embodiments described herein.

In the following specification and the claims, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and the claims, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "axial" and "axially" refer to directions and orientations extending substantially parallel to a longitudinal or rotation axis of the motor assembly. The terms "radial" and "radially" refer to directions and orientations extending substantially perpendicular to the rotation axis. The terms "tangent" and "tangential" refer to the directions and orientations extending substantially perpendicular to a radial direction of the motor assembly. In addition, as used herein, the terms "circumferential" and "circumferentially" refer to directions and orientations extending in the general direction around the rotation axis of the motor assembly (such references not being limited to pure circular extension or to the periphery or outer perimeter of the object unless the context clearly indicates otherwise). Moreover, directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

Example Electric Machine with Shaft Ground Assembly

Figure 2:
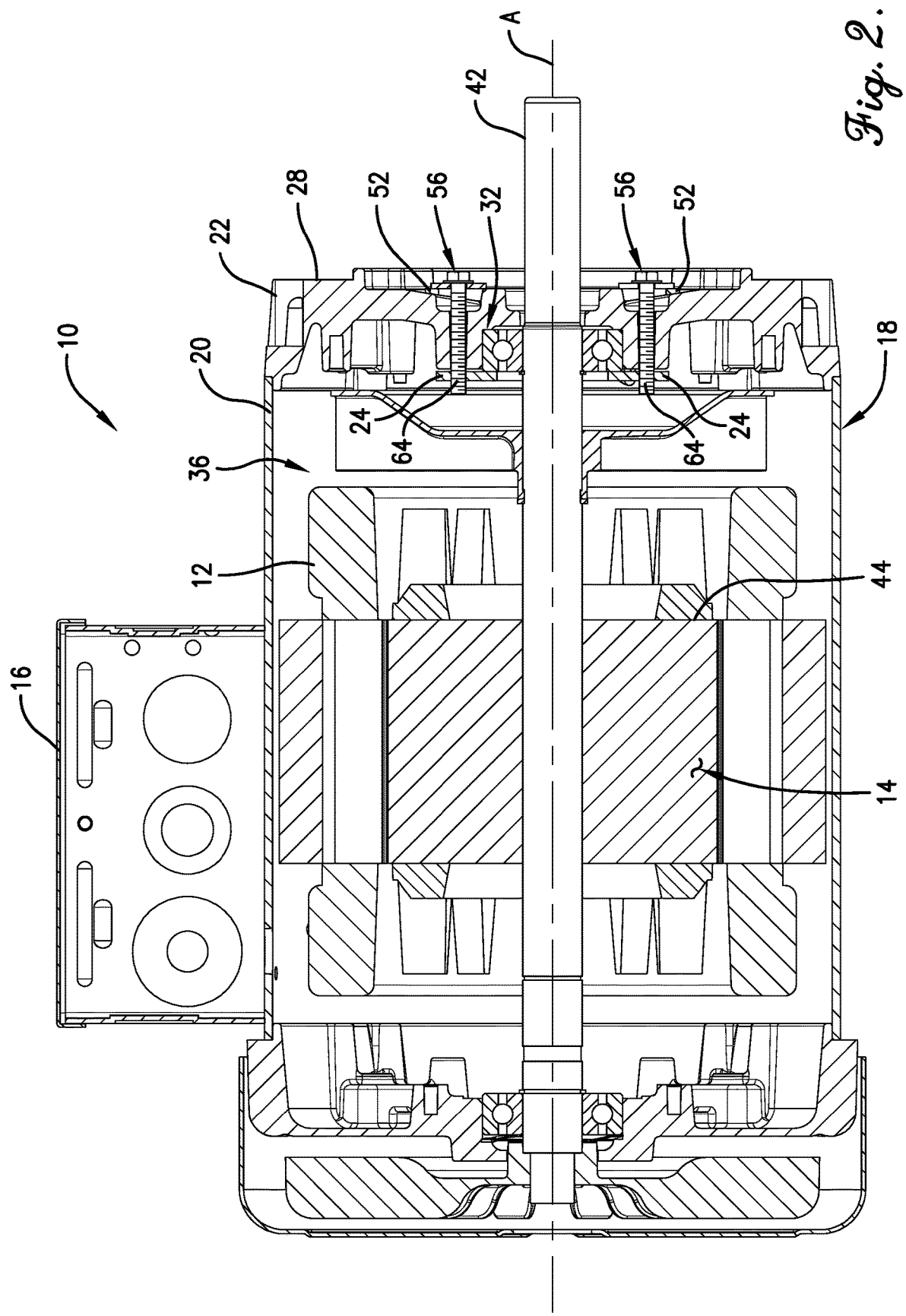
FIG. 2 is a sectional side view of the electric motor shown in FIG. 1, taken about the plane 2-2 shown in FIG. 1.
Figure 3:
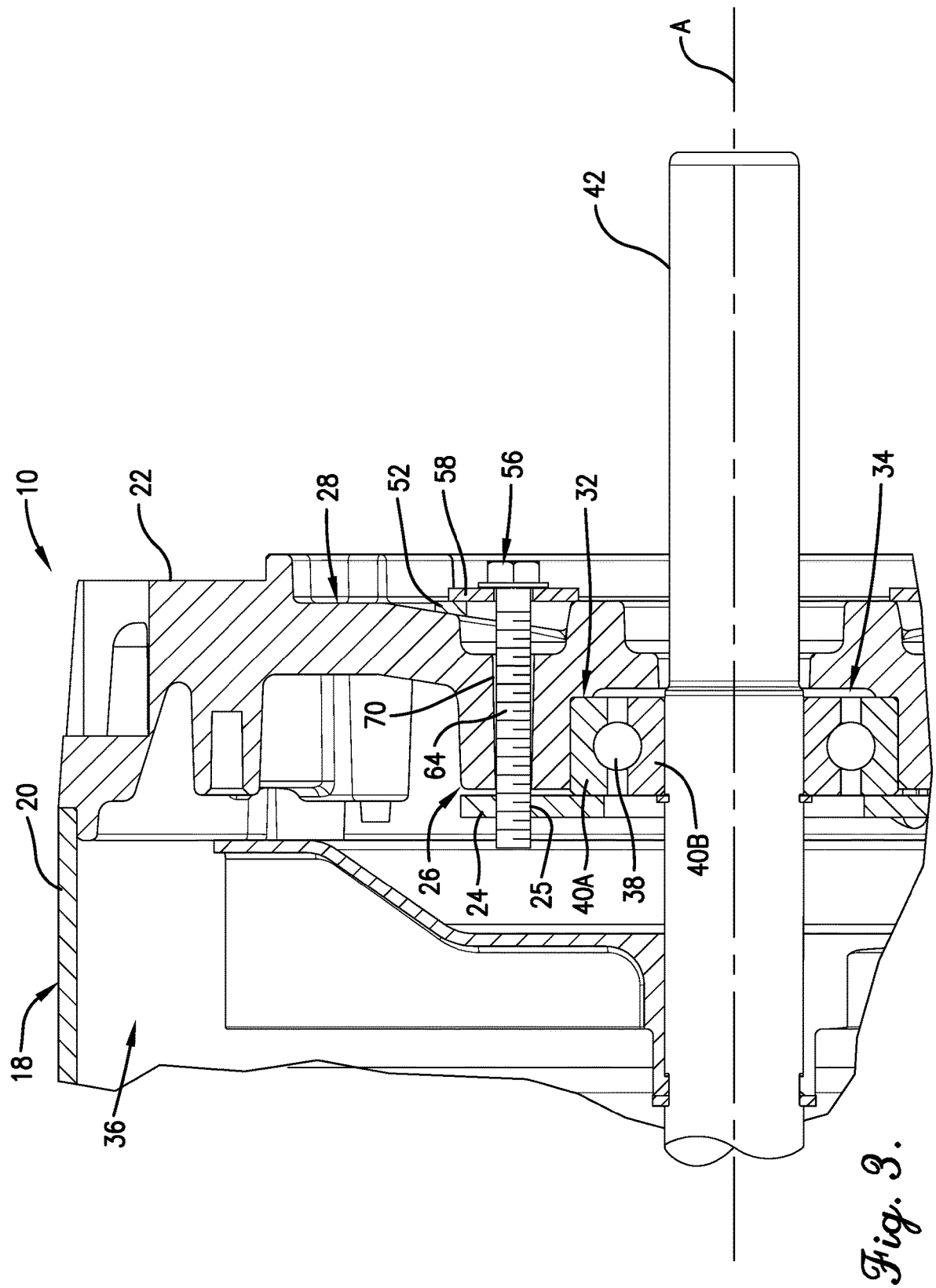
FIG. 3 is an enlarged sectional side view of a portion of the electric motor shown in FIG. 2.

FIG. 1 is a perspective view of an exemplary electric motor 10 having a shaft ground assembly 50 (broadly, a grounding kit) coupled thereto, in accordance with one aspect of the present invention. FIG. 2 is a sectional side view of the electric motor 10, taken about plane 2-2 shown in FIG. 1. FIG. 3 is an enlarged sectional side view of a portion of the electric motor 10 shown in FIG. 2. In the exemplary embodiment, the electric motor 10 is illustrated as an inner rotor motor. As will be described, an inner rotor motor has magnets positioned radially inward relative to windings, which function as a stator. However, according to some aspect of the present invention, the electric motor 10 may alternately be an outer rotor motor or dual rotor motor.

As shown in FIGS. 1-3, the illustrated electric motor 10 generally includes a stator assembly 12, a rotor assembly 14 supported for rotation relative to the stator assembly 12, a controller housing 16 enclosing control electronics (not shown) for controlling operation of the electric motor 10, a housing 18 including a shell 20 and a motor endshield 22, a first bearing assembly 32, and a second bearing assembly (not labelled) proximate the proximate the end of the motor 10 with the controller housing 16. The shell 20 of the housing 18 is generally cylindrical in shape and includes a cavity 36 for receiving at least a portion of the stator assembly 12 and the rotor assembly 14. The motor endshield 22 cooperates with the shell 20 to at least partially define a motor chamber in which the stator assembly 12 and the rotor assembly 14 are at least substantially housed. The controller housing 16 is coupled to the shell 20 and encloses the control electronics and other various power and controller components (not shown) of the electric motor 10 therein. While the illustrated embodiment is one configuration of the electric motor 10, it is noted that electric motors of various configurations are contemplated, including, for example, electric motors having vented or otherwise open motor housings or shells, etc.

In the exemplary embodiment, the motor endshield 22 includes a bearing support 34 defined therein and positioned substantially in a center of the motor endshield 22 such that the bearing support 34 is aligned axially with and concentric with a rotation axis "A" of the electric motor 10. The bearing support 34 is sized and shaped to receive and secure the bearing assembly 32 therein. For example, and without limitation, as shown in FIGS. 2 and 3, the bearing support 34 is a recessed portion or bearing cup defined on the interior side 26 of the motor endshield 22. Alternatively, the bearing support 34 is any structure or component, such as an aperture, configured to receive and secure the bearing assembly 32 and that enables the electric motor 10 to function as described herein.

The first and second bearing assemblies are configured to rotatably support at least a portion of the rotor assembly 14. In particular, the rotor assembly 14 preferably includes a rotor shaft 42 fixedly supporting a rotor core 44 with the rotor shaft 42 extending axially through the first bearing assembly 32 and the second bearing assembly (not labelled). In the exemplary embodiment, the first bearing assembly 32 is a ball bearing assembly including a plurality of steel balls 38 positioned between an outer race 40a and an inner race 40b. The outer race 40a of the first bearing assembly 32 is coupled to the bearing support 34. The inner race 40b is fixedly coupled to the rotor shaft 42 and is configured to rotate relative to the outer race 40a via the interposed steel balls 38. In alternative embodiments, the first bearing assembly 32 can be any type of bearing and/or bearing assembly that enables the electric motor 10 to function as described herein, such as a roller bearing.

Figure 4:
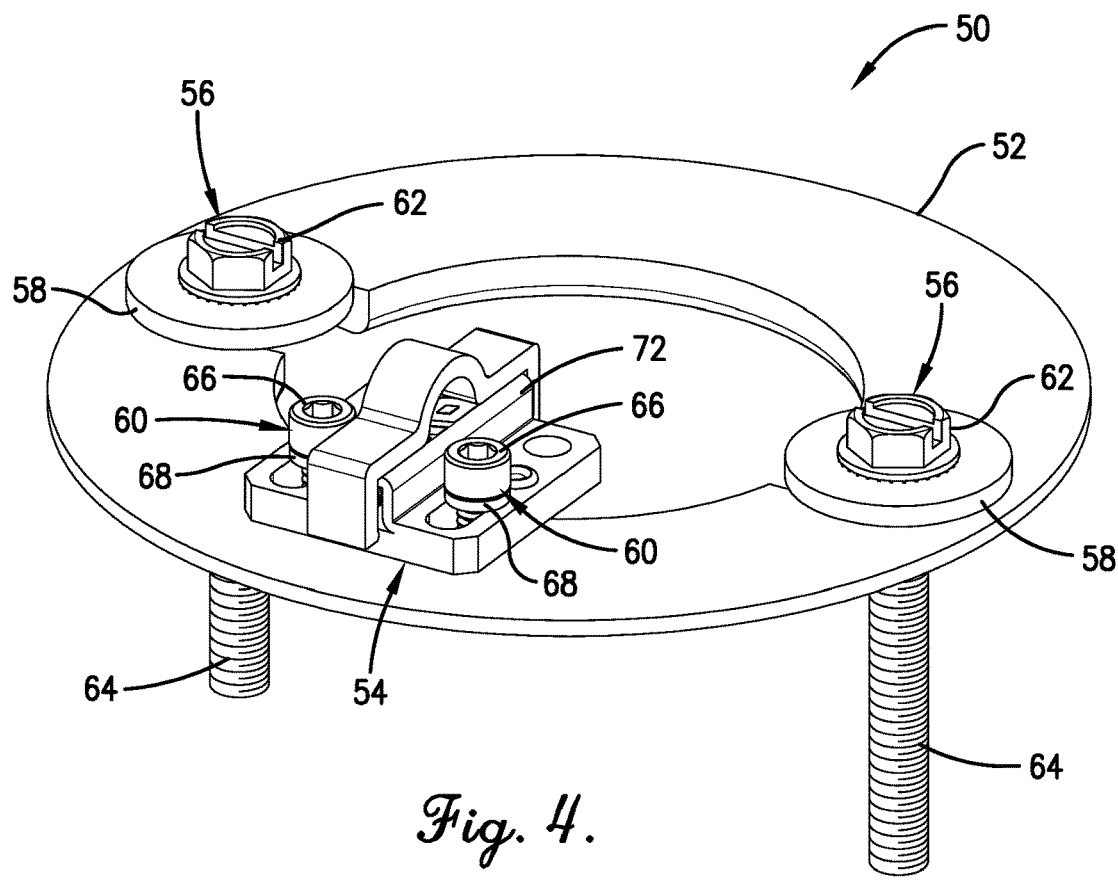
FIG. 4 is a perspective view of the shaft ground assembly shown in FIGS. 1-3.

In the exemplary embodiment, the electric motor 10 also includes the shaft ground assembly 50 coupled to the motor endshield 22. FIG. 4 is a perspective view of the shaft ground assembly 50 shown coupled to the motor endshield 22 in FIGS. 1-3. The shaft ground assembly 50 includes a mounting plate 52, a shaft ground 54 including a conductive element 72 configured to electrically couple to the rotor shaft 42, a plurality of mounting plate fasteners 56, a plurality of mounting plate washers 58, and a plurality of shaft ground fastener assemblies 60 configured to couple the shaft ground 54 to the mounting plate 52. Each of the mounting plate fasteners 56 have a fastener head 62 and a threaded fastener shaft 64. In addition, each of the shaft ground fastener assemblies 60 include a threaded ground fastener 66 and a ground washer 68.

The body of the shaft ground 54 includes an enclosure fabricated from an electrically conductive material. The conductive element 72 fits within the enclosure to both secure the conductive element 72 in place and electrically connect the conductive element 72 to the enclosure and the motor endshield 22. The conductive interface of the shaft ground 54 between the rotor shaft 42 and the motor endshield 22 provides a path for an electrical charge from the motor shaft 42 to pass through the conductive element 72, the body of the shaft ground 54, and the motor endshield 22 to an electrical ground. Alternate methods form a ground path using a wire or other electrical conductor (not shown) that is attached to the shaft ground 54 and provides a path for an electric charge from the rotor shaft 42 to pass through the conductive element 72 and shaft ground body to an electric ground. While the shaft ground 54 described herein includes an enclosed carbon brush configuration, it is noted that the shaft ground 54 may include, without limitation, a grounding ring, shaft grounding brush, and the like.

The mounting plate washers 58 are sized to receive the threaded fastener shaft 64 of a respective mounting plate fastener 56 and to engage the mounting plate 52 to secure it to the motor endshield 22. For example, each mounting plate washer 58 is sized such that at least a peripheral portion of the mounting plate washer 58 is larger than an a respective fastener opening 80 (shown in FIG. 5) to provide an overlap engagement with the mounting plate 52. In particular, each mounting plate washer 58 includes a first washer surface sized to engage the mounting plate 52 and an opposite second washer surface sized to engage the fastener head 62 of the mounting plate fastener 56. Each ground washer 68 is sized to receive a respective threaded ground fastener 66 therethrough and has a thickness sized to prevent the ground fastener 66 from extending through the mounting plate 52.

In certain embodiments, it is contemplated that the shaft ground assembly 50 may be free of the mounting plate washers 58. In such embodiments, the fastener head 62 of the mounting plate fastener 56 is sized such that at least a peripheral portion of the fastener head 62 is larger than an a respective fastener opening 80 to provide an overlap engagement with the mounting plate 52.

In the exemplary embodiment, the electric motor 10 is configured to be mounted vertically. As described above, a vertically mounted electric motor is one in which the output shaft (i.e., the rotor shaft 42) is oriented vertically to enable the output shaft to be coupled to an output device positioned above or below the electric motor 10. Therefore, to facilitate securing the first bearing assembly 32 in the bearing support 34, the electric motor 10 includes an internal bearing lockplate 24. It is noted, however, that the internal bearing lockplate 24 may be used with any electric motor, positioned in any orientation, including, for example, a horizontally mounted motor where the output shaft is oriented generally horizontally.

The internal bearing lockplate 24 is sized to engage the outer race 40a of the first bearing assembly 32 to secure the first bearing assembly 32 in the bearing support 34. The threaded fastener shaft 64 of each mounting plate fastener 56 extends through a fastener hole 70 defined between the interior side 26 and an exterior side 28 of the motor endshield 22. In addition, each threaded fastener shaft 64 threadably engages the internal bearing lockplate 24, thereby securing the mounting plate 52 along the exterior side 28 of the motor endshield 22 and securing the bearing lockplate 24 against the first bearing assembly 32 along the interior side 26 of the motor endshield 22.

Mounting Plate

Figure 5:
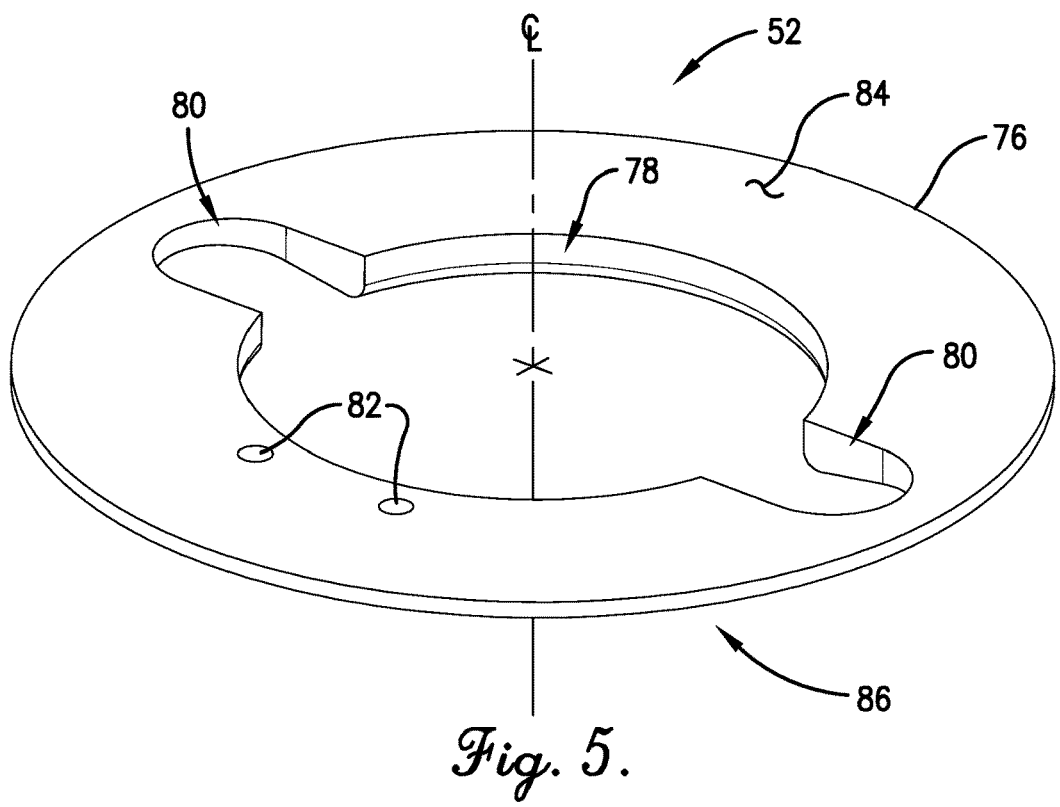
FIG. 5 is a perspective view of a mounting plate of the shaft ground assembly shown in FIG. 4.
Figure 6:
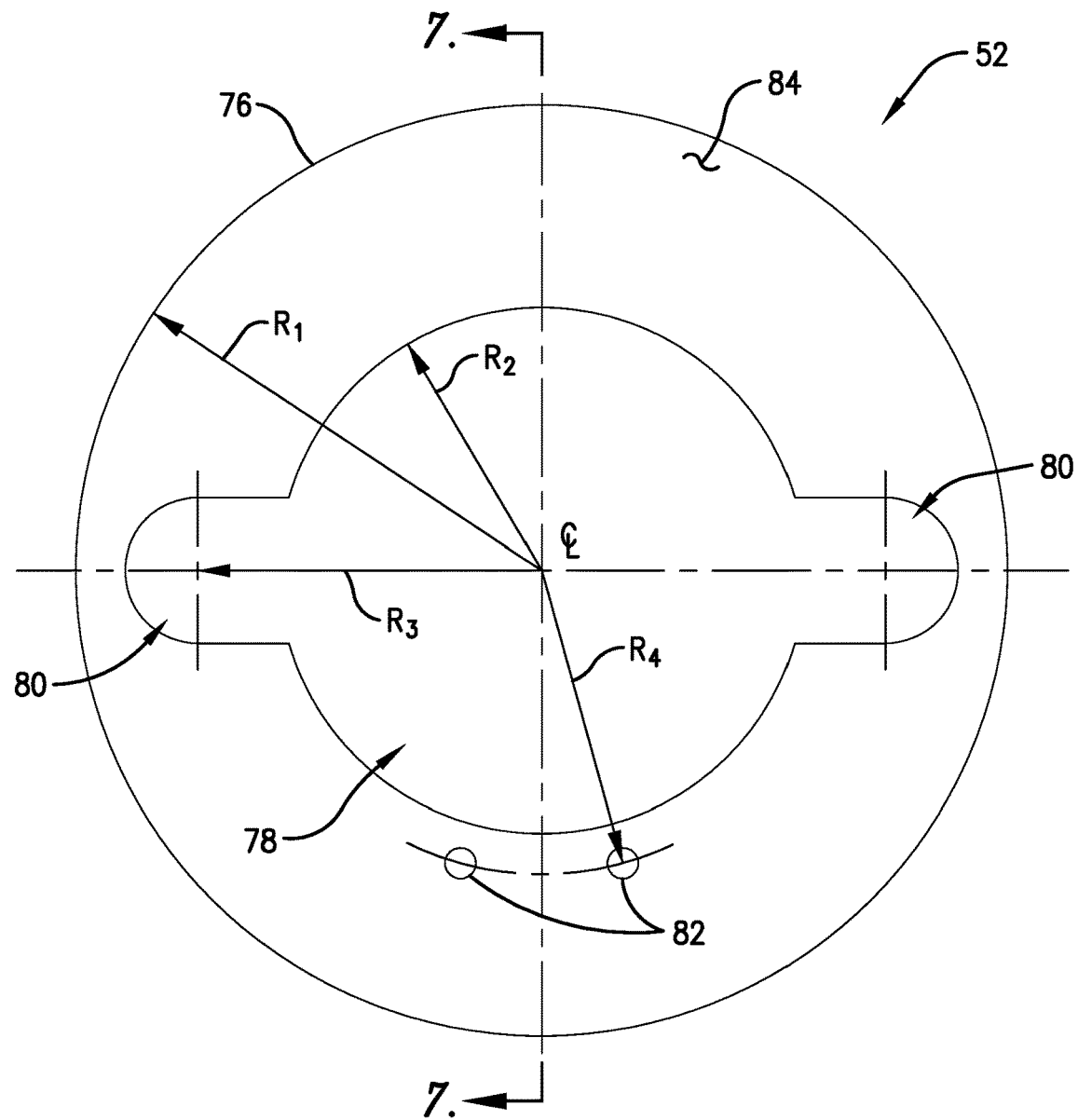
FIG. 6 is a top view of the mounting plate shown in FIG. 5.
Figure 7:
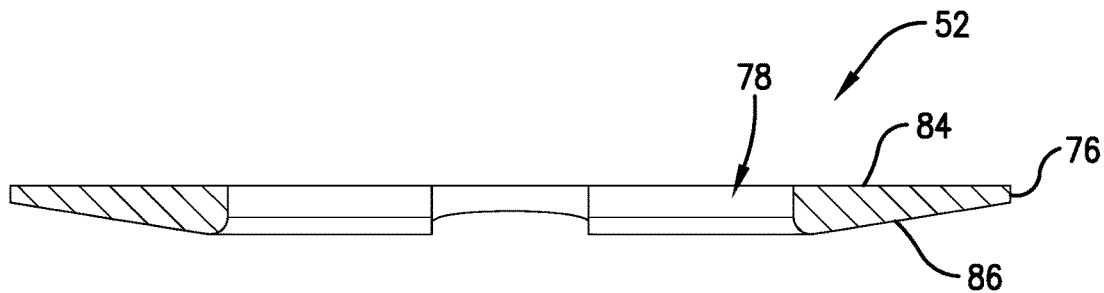
FIG. 7 is a sectional view of the mounting plate, taken about line 7-7 shown in FIG. 6.

FIG. 5 is a perspective view of the mounting plate 52 of the shaft ground assembly 50 (shown in FIG. 4). FIG. 6 is a top view of the mounting plate 52. FIG. 7 is a sectional view of the mounting plate 52, taken about line 7-7 shown in FIG. 6. In the exemplary embodiment, the mounting plate 52 is substantially circular in form, having a circumferentially continuous annular body 76 extending about a centerline (L) at a predetermined radial distance $R_1$. The mounting plate 52 also includes a shaft relief portion 78 substantially centered thereon about the centerline (L). The shaft relief portion 78 defines a generally circular opening having a predetermined radial distance $R_2$. The shaft relief portion 78 is configured to receive the rotor shaft 42 (shown in FIGS. 1-3) therethrough.

The mounting plate 52 also includes a plurality of fastener openings 80 located outboard of the shaft relief portion 78. Each fastener opening 80 is formed as a slot opened to the shaft relief portion 78 and having a full radius closed end opposite the shaft relief portion 78. The center of the closed end of the slot is located at a predetermined radial distance $R_3$ from the centerline (L). Radial distance $R_3$ is greater than radial distance $R_2$ and less than radial distance $R_1$, thereby locating the closed end of the slot within the body 76 of the mounting plate 52. The fastener openings 80 are configured to align with the fastener holes 70 (shown in FIG. 3) when the mounting plate 52 is secured along the exterior side 28 of the motor endshield 22. In the exemplary embodiment, as illustrated in FIG. 6, the two (2) fastener openings 80 are positioned about the centerline (₵) at approximately one hundred and eighty degrees (180°), or diametrically opposite, from each other. In addition, the fastener openings 80 are sized to enable a lockplate fastener (described further herein) to pass through the opening when withdrawing the lockplate fastener exteriorly from the fastener hole 70 in the motor endshield 22. In certain embodiments, the fastener openings 80 are sized to enable a tool (e.g., a nut driver, a socket or drive socket, etc.) to pass through the opening to facilitate removal of a lockplate fastener (i.e., withdrawing the lockplate fastener exteriorly from the fastener hole 70 in the motor endshield 22). In the exemplary embodiment, the mounting plate 52 includes two (2) fastener openings 80. It is contemplated, however, that the mounting plate 52 may have fewer or more than two (2) fastener openings 80, based at least partially upon the configuration of the electric motor 10, and the openings may be circumferentially spaced as required by the motor configuration.

In the exemplary embodiment, the mounting plate 52 also includes a plurality of shaft ground mounting holes 82 positioned a predetermined radial distance $R_4$ from the centerline (₵). Radial distance $R_4$ is greater than radial distance $R_2$ and less than radial distance $R_1$, thereby locating the shaft ground mounting holes 82 within the body 76 of the mounting plate 52. In the exemplary embodiment, each shaft ground mounting hole 82 is threaded and is configured to receive a threaded ground fastener 66 (shown in FIG. 4) for securing the shaft ground 54 (shown in FIG. 4) to the mounting plate 52. In certain other embodiments, the shaft ground mounting holes 82 may be other than threaded.

In the exemplary embodiment, the mounting plate 52 includes two (2) shaft ground mounting holes 82. It is contemplated, however, that the mounting plate 52 may have fewer or more than two (2) shaft ground mounting holes 82, based at least partially upon mounting requirements of the shaft ground 54 and/or the desire to provide for multiple mounting locations for one or more shaft grounds 54. For example, in some applications, it may be desirable to simultaneously utilize multiple shaft grounds mounted at ninety degree (90°) angles relative to one another to accommodate potential orthogonal shaft deflections.

As illustrated in FIG. 6, the exemplary mounting plate 52 is substantially symmetrical about line 7-7. It is noted, however, that the fastener openings 80 and/or the shaft ground mounting hole 82 may be located on the mounting plate 52 in any desirable location, the location(s) of which may be dictated by a specific motor and/or shaft ground configuration.

Referring to FIG. 7, the mounting plate 52 includes a substantially planar first plate surface 84 and an opposite second plate surface 86. In section, the second plate surface 86 is substantially planar but is not parallel to first plate surface 84. As such, the second plate surface 86 defines at least a partial frusto-conical portion of the mounting plate 52 configured to engage the exterior side 28 of the motor endshield 22. In the exemplary embodiment, as illustrated in FIG. 3, the frusto-conical portion of the mounting plate 52 is shaped to complement at least a portion of the exterior side 28 of the motor endshield 22 to be matingly received therein. Alternative complementary shapes, non-complemented engagements, and/or intermediate coupling components are within the ambit of certain aspects of the present invention.

Electric Machine with Alternative Shaft Ground Assembly

Figure 8:
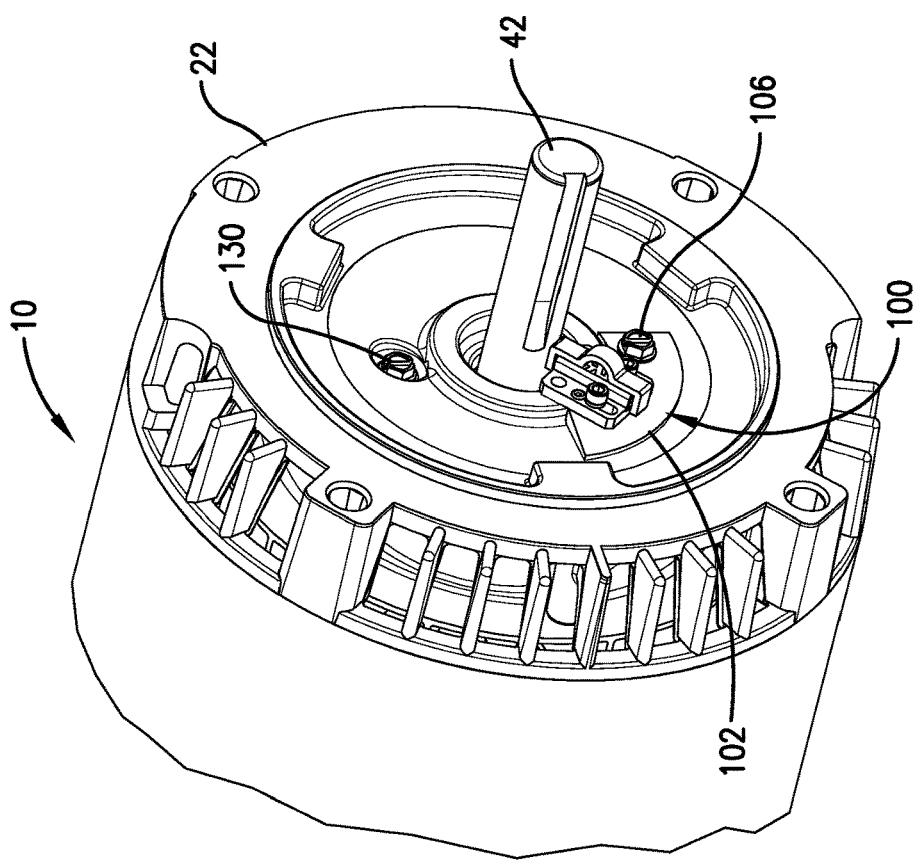
FIG. 8 is a perspective view of the electric motor shown in FIG. 1 having an alternative shaft ground assembly coupled thereto, in accordance with another aspect of the present invention.

FIG. 8 is a perspective view of the electric motor 10 having an alternative shaft ground assembly 100 (broadly, a grounding kit) coupled thereto, in accordance with another aspect of the present invention. The electric motor includes a lockplate fastener 130 coupled to the motor endshield 22 and the internal bearing lockplate 24 (shown in FIG. 3) such that the internal bearing lockplate is secured along the interior side 26 of the motor endshield 22.

Figure 9:
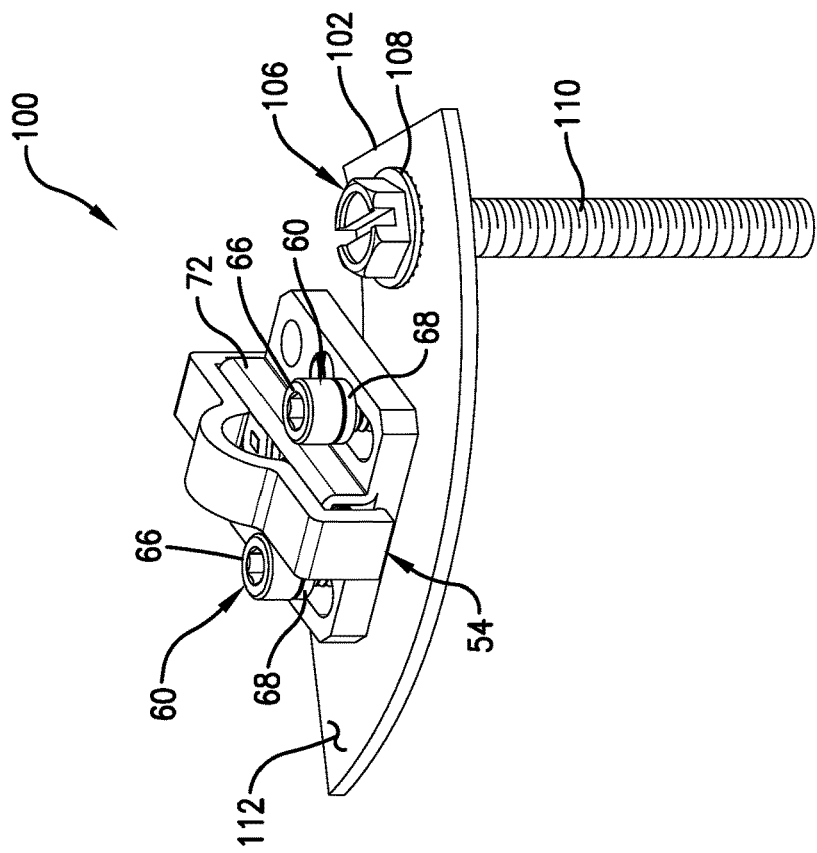
FIG. 9 is a perspective view of the shaft ground assembly shown in FIG. 8.

FIG. 9 is a perspective view of the shaft ground assembly 100 shown coupled to the motor endshield 22 in FIG. 8. The shaft ground assembly 100 includes an arcuate mounting plate 102, the shaft ground 54, a mounting plate fastener 106, and a plurality of the shaft ground fastener assemblies 60 configured to couple the shaft ground 54 to the mounting plate 102. The mounting plate fastener 106 has a fastener head 108 and a threaded fastener shaft 110. The fastener head 108 is sized to engage a substantially planar first plate surface 112 when the fastener shaft 110 is received in a fastener opening 120 (shown in FIG. 10) and the fastener hole 70 (shown in FIG. 3), and threadably engaged with the bearing lockplate 24 (shown in FIG. 3), to thereby secure the mounting plate 102 against the exterior side 28 of the motor endshield 22.

Arcuate Mounting Plate

Figure 10:
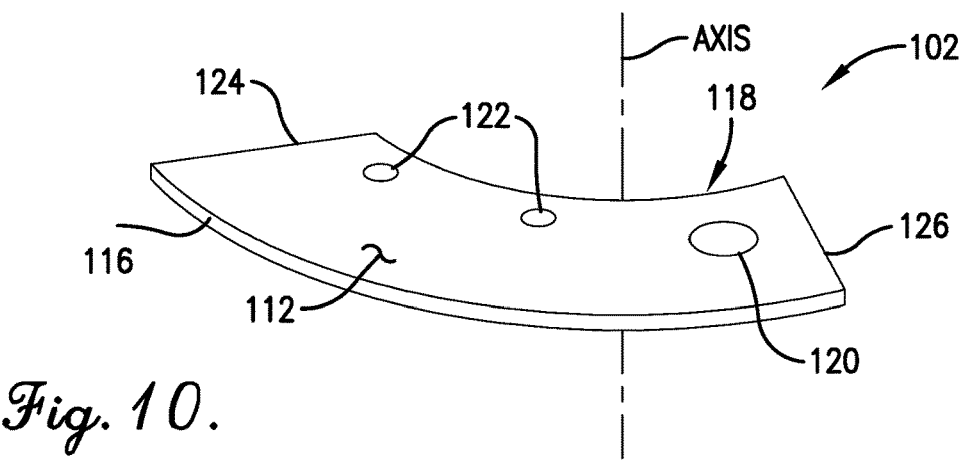
FIG. 10 is a perspective view of an arcuate mounting plate of the shaft ground assembly shown in FIG. 9.
Figure 11:
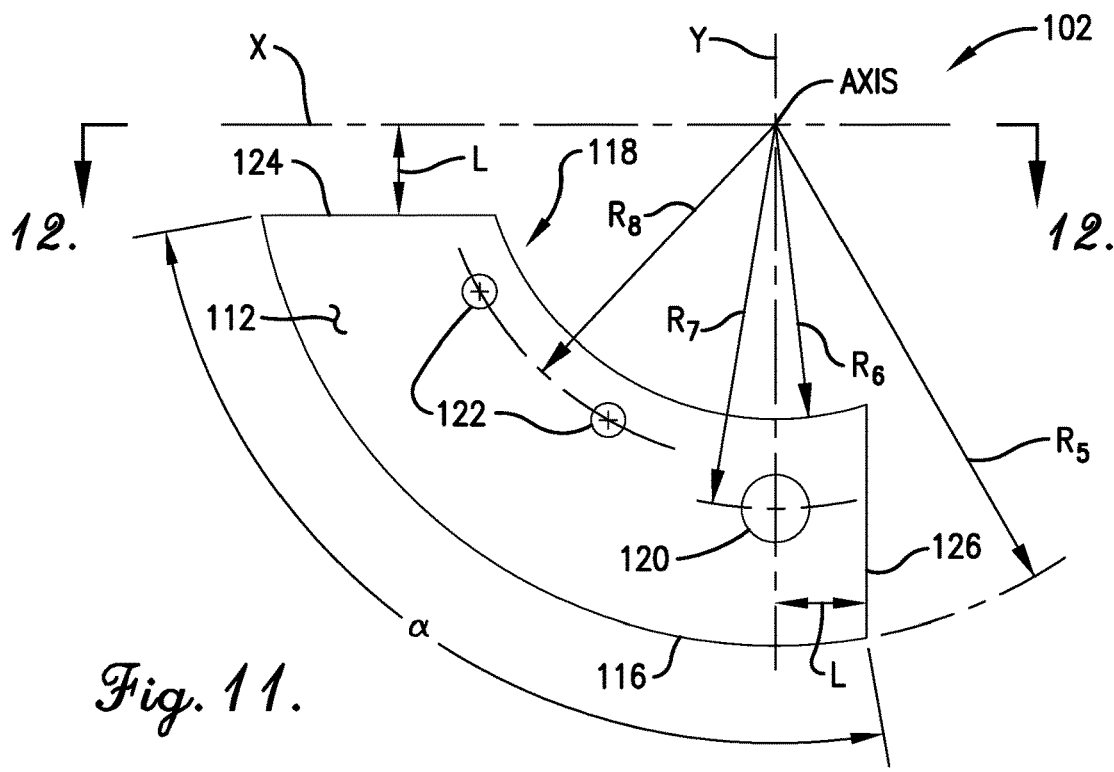
FIG. 11 is a top view of the arcuate mounting plate shown in FIG. 10.
Figure 12:
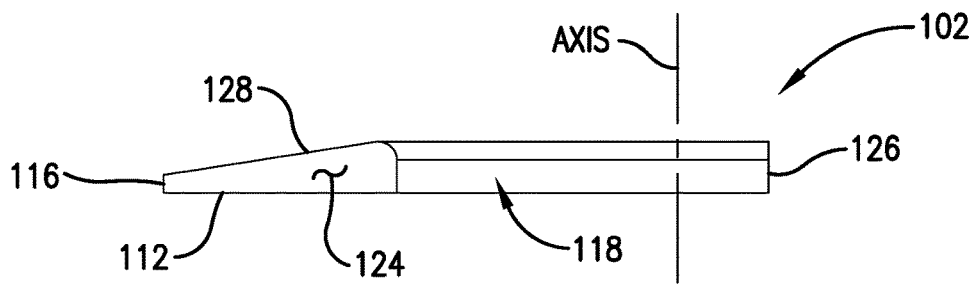
FIG. 12 is an end view of the arcuate mounting plate, viewed from line 12-12 shown in FIG. 11.

FIG. 10 is a perspective view of the arcuate mounting plate 102 of the shaft ground assembly 100 (shown in FIG. 9). FIG. 11 is a top view of the arcuate mounting plate 102. FIG. 12 is an end view of the arcuate mounting plate 102, viewed from line 12-12 shown in FIG. 11. In the exemplary embodiment, the mounting plate 102 has a substantially arcuate body 116 extending about an axis at a predetermined radial distance $R_5$. The mounting plate 102 also includes a shaft relief portion 118 substantially concentric with the axis. The shaft relief portion 118 defines a generally arcuate-shaped relief having a predetermined radial distance $R_6$. The shaft relief portion 118 is configured to provide clearance for the rotor shaft 42 (shown in FIGS. 1-3).

The arcuate body 116 extends in a semicircular arc about the axis at an angle α in the range between and including about eighty-five degrees (85°) and about ninety-five degrees (95°). In addition, as illustrated in FIG. 11, a first end 124 of the arcuate body 116 is parallel to the horizontal axis "X" and is located a predetermined distance "L" therefrom. Furthermore, a second end 126 of the arcuate body 116 is parallel to the vertical axis "Y" and is located the same predetermined distance "L" therefrom. Such a configuration of the arcuate body 116 facilitates reducing manufacturing cost and increasing manufacturing efficiency (e.g., as compared to the mounting plate 52 (shown in FIG. 5)). For example, four (4) arcuate bodies 116 can be fabricated from one (1) annular body.

The mounting plate 102 also includes a fastener opening 120 located outboard of the shaft relief portion 118. The fastener opening 120 is formed as a substantially circular aperture extending through the arcuate body 116. The center of the fastener opening 120 is located at a predetermined radial distance $R_7$ from the axis. In the illustrated embodiment, the radial distance $R_7$ is greater than radial distance $R_6$ and less than radial distance $R_5$, thereby locating the fastener opening 120 within the body 116 of the mounting plate 102. The fastener opening 120 is configured to align with the fastener hole 70 (shown in FIG. 3) when the mounting plate 102 is secured along the exterior side 28 of the motor endshield 22. In the exemplary embodiment, the mounting plate 102 include one (1) fastener opening 120. It is contemplated, however, that the mounting plate 102 may have more than one (1) fastener opening 120, based at least partially upon the configuration of the electric motor 10.

In the illustrated embodiment, the mounting plate 102 also includes a plurality of shaft ground mounting holes 122 positioned a predetermined radial distance $R_8$ from the axis. In the illustrated embodiment, the distance $R_8$ is greater than radial distance $R_6$ and less than radial distance $R_5$, thereby locating the shaft ground mounting holes 122 within the body 116 of the mounting plate 102. In the illustrated embodiment, each shaft ground mounting hole 122 is threaded and is configured to receive the threaded ground fastener 66 (shown in FIG. 9) for securing the shaft ground 54 (shown in FIG. 9) to the mounting plate 102. In certain other embodiments, the shaft ground mounting holes 122 may be other than threaded.

In the exemplary embodiment, the mounting plate 102 includes two (2) shaft ground mounting holes 122. It is contemplated, however, that the mounting plate 102 may have fewer or more than two (2) shaft ground mounting holes 122, based at least partially upon mounting requirements of the shaft ground 54 and/or the desire to provide for multiple mounting locations for one or more shaft grounds 54.

Referring to FIG. 12, the mounting plate 102 includes the substantially planar first plate surface 112 and an opposite second plate surface 128. In section, the second plate surface 128 is substantially planar but is not parallel to first plate surface 112. As such, the second plate surface 128 defines at least a partial frusto-conical portion of the mounting plate 102 configured to engage the exterior side 28 of the motor endshield 22.

Method of Assembly

Figure 13:
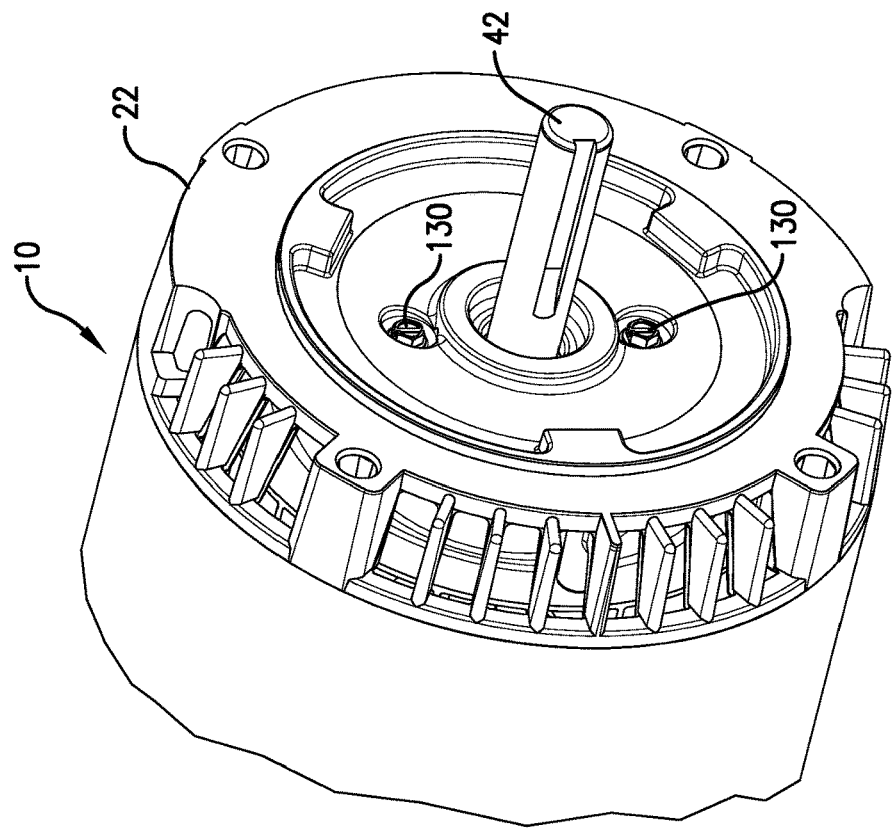
FIG. 13 is a perspective view of an electric motor without a shaft ground assembly.

FIG. 13 is a perspective view of the electric motor 10 without a shaft ground assembly coupled thereto. As described herein, the shaft ground assembly 50 (shown in FIG. 4) and the shaft ground assembly 100 (shown in FIG. 9) are configured to electrically ground the rotor shaft (e.g., rotor shaft 42) of an electric motor (e.g., electric motor 10) to reduce electrical currents passing across the rotor shaft bearings of the motor. In particular, the shaft ground assembly 50 and the shaft ground assembly 100 are particularly suitable as a retrofit for the electric motor 10 without the need to disassemble to motor. The operations described below for attaching the shaft ground assembly 50 or the shaft ground assembly 100 to an electric motor 10 allow a bearing (e.g., the first bearing assembly 32) to remain secured in place during the retrofit process. In addition, attaching the shaft ground assembly 50 or the shaft ground assembly 100 to an electric motor 10 does not require any additional machining of the electric motor 10 or any special tools.

The following describes coupling the shaft ground assembly 50 to the electric motor 10. As illustrated in FIG. 13, the electric motor 10 includes a plurality of the lockplate fasteners 130. As described herein referring to FIG. 8, the lockplate fasteners 130 are coupled to the motor endshield 22 and the internal bearing lockplate 24 (shown in FIG. 3) such that the internal bearing lockplate is secured along the interior side 26 of the motor endshield 22. The configuration of the electric motor 10 illustrated in FIG. 13 is a typical configuration of the motor without a shaft grounding assembly.

Figure 14:
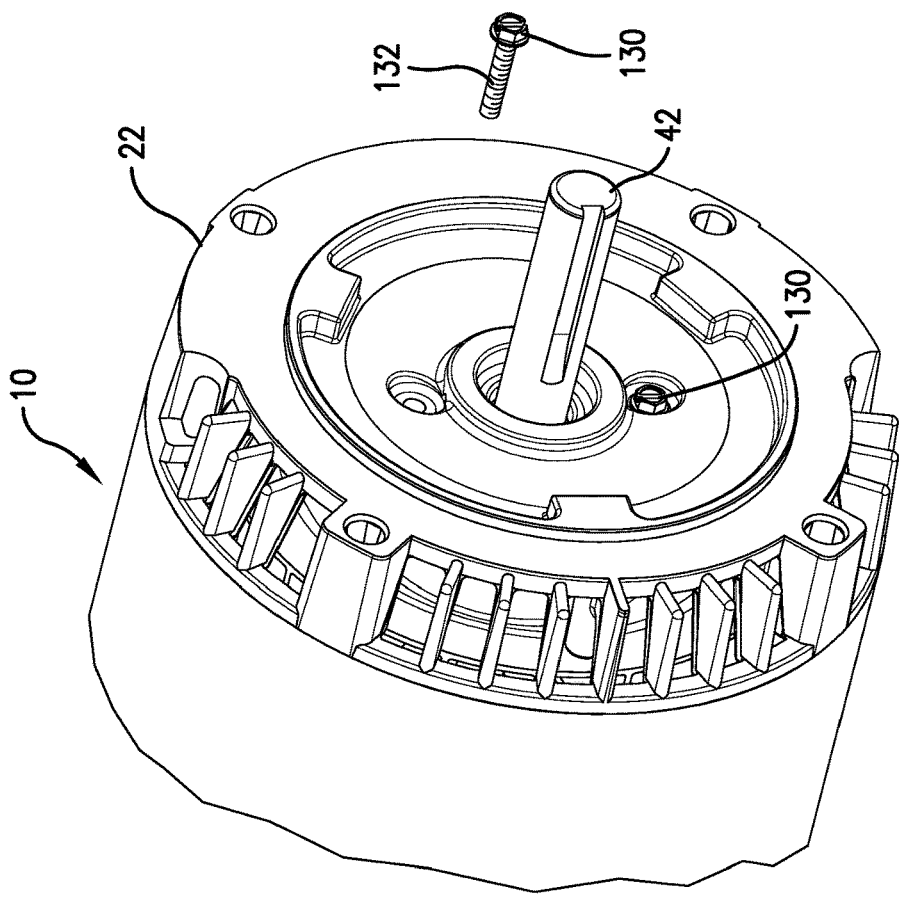
FIG. 14 is a perspective view of the electric motor illustrating the step of removing a lockplate fastener therefrom.

To electrically ground the rotor shaft 42 of the electric motor 10, a first lockplate fastener 130 is removed from the motor endshield 22 and the internal bearing lockplate 24, as illustrated in FIG. 14. More particularly, the first lockplate fastener 130 is unscrewed from a first threaded bore 25 (shown in FIG. 3) in the bearing lockplate 24. The first lockplate fastener 130 is withdrawn exteriorly from the fastener hole 70 (shown in FIG. 3) in the motor endshield 22. A second lockplate fastener 130 remains coupled to the motor endshield 22 and the internal bearing lockplate 24 such that the internal bearing lockplate 24 remains secured along the interior side 26 of the motor endshield 22.

Figure 15:
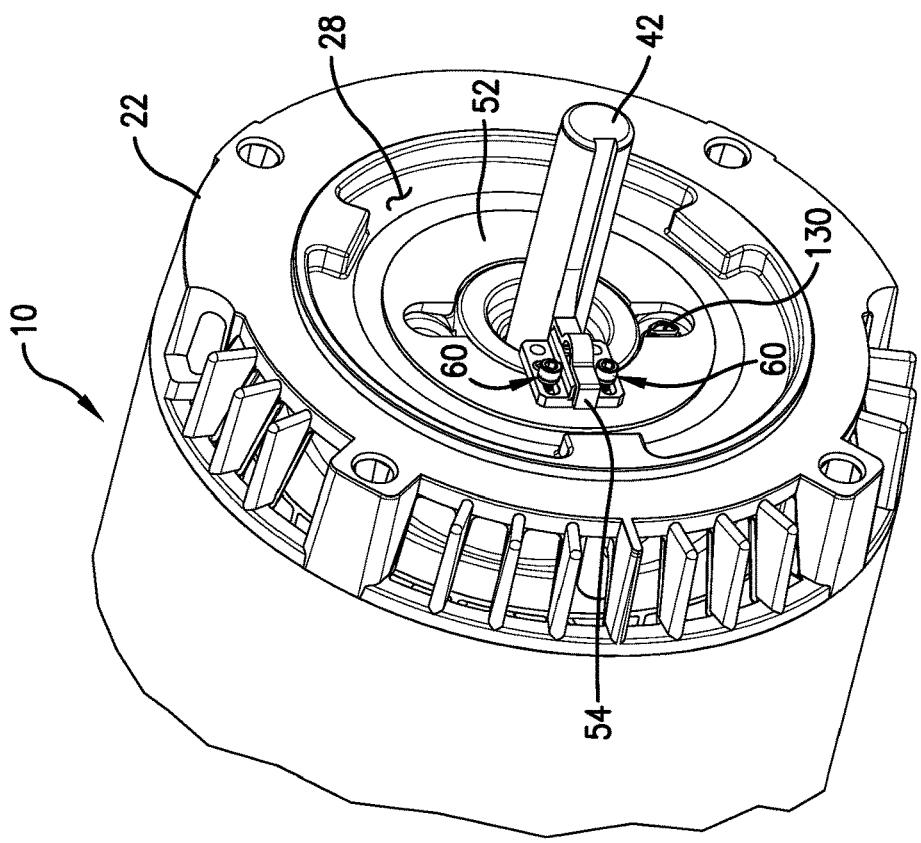
FIG. 15 is a perspective view of the electric motor illustrating the step of attaching a shaft ground to the mounting plate.

Referring to FIG. 15, in the exemplary embodiment, after removing the first lockplate fastener 130 from the electric motor 10, the mounting plate 52 of the shaft ground assembly 50 is positioned along the exterior side 28 of the motor endshield 22 such that the second plate surface 86 is in face to face contact with the exterior side 28. In the exemplary embodiment, the shaft ground 54 is coupled to the mounting plate 52 prior to or during installation of the mounting plate 52 to the electric motor 10. Alternatively, in some embodiments, the mounting plate 52 is positioned against the motor endshield without the shaft ground 54 attached thereto.

Positioning of the mounting plate 52 includes aligning a first fastener opening 80 of the mounting plate 52 with the first fastener hole 70 in the motor endshield 22. The rotor shaft 42 is received through the shaft opening 78 of the mounting plate 52.

Figure 16:
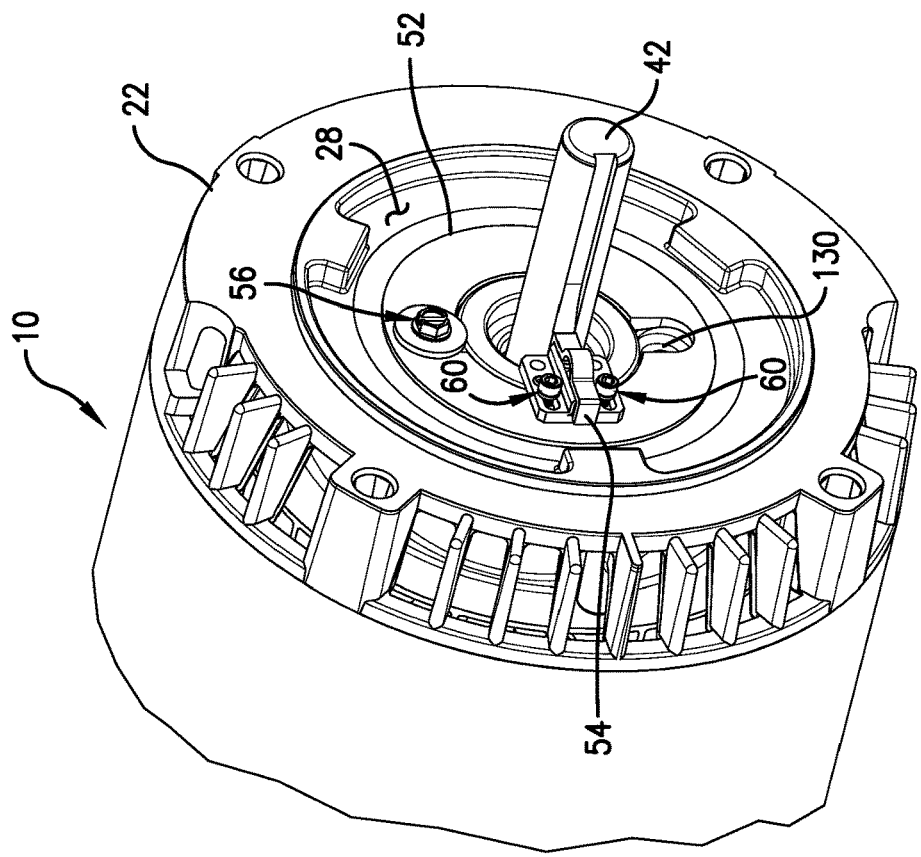
FIG. 16 is a perspective view of the electric motor illustrating the step of coupling a mounting plate fastener to the electric motor to retain the mounting plate.

After the mounting plate 52 is positioned against the motor endshield 22, the first lockplate fastener 130 is replaced with a first mounting plate fastener 56, as illustrated in FIG. 16. The first lockplate fastener 130 and the first mounting plate fastener 56 each include a threaded fastener shaft having the same thread specification. The threaded fastener shaft 64 of the first mounting plate fastener 56 is longer than the threaded fastener shaft 132 (shown in FIG. 14) of the first lockplate fastener 130. Furthermore, the first mounting plate fastener 56 includes a first mounting plate washer 58 sized to engage the mounting plate 52.

The first mounting plate fastener 56 is coupled to the mounting plate 52, the motor endshield 22, and the bearing lockplate 24 to secure the mounting plate 52 along the exterior side 28 of the endshield 22, and to secure the bearing lockplate 24 along the interior side 26 of the motor endshield 22. Specifically, the first mounting plate fastener 56 is inserted through a fastener opening 80 of the mounting plate 52 and the fastener hole 70. The first mounting plate fastener 56 is then threaded into the first threaded bore 25.

Figure 17:
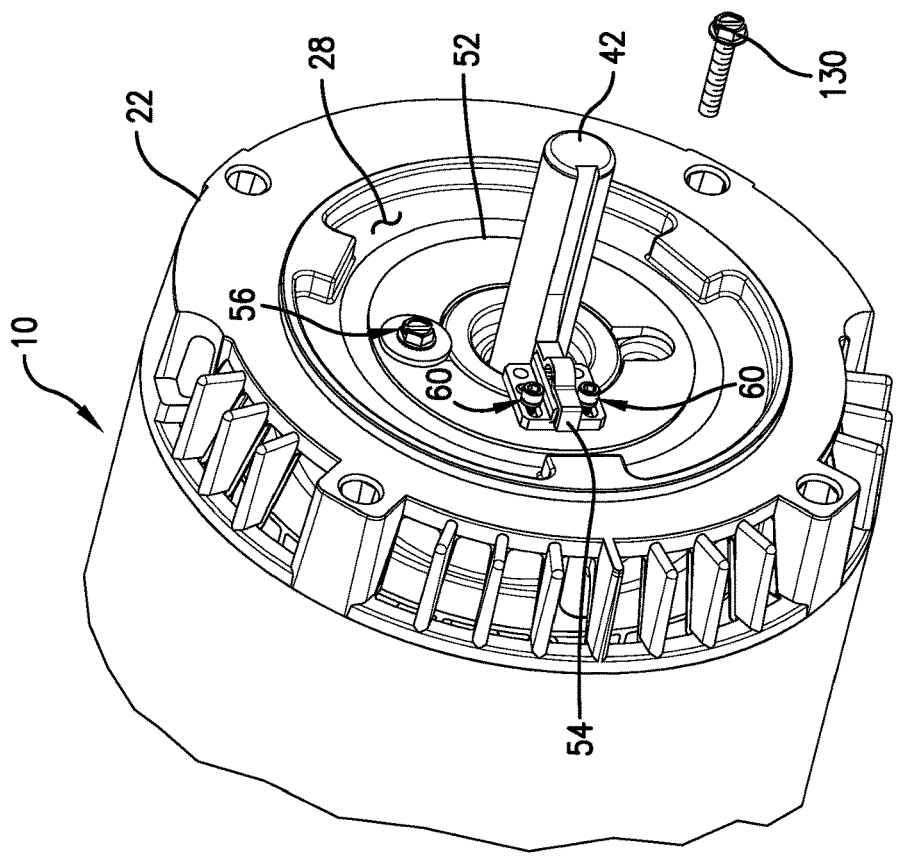
FIG. 17 is a perspective view of the electric motor illustrating the step of removing a second lockplate fastener therefrom.

After the first lockplate fastener 130 is replaced with the first mounting plate fastener 56, the second lockplate fastener 130 is preferably removed from the motor endshield 22 and the internal bearing lockplate 24, as illustrated in FIG. 17. The first mounting plate fastener 56 remains coupled to the motor endshield 22 and the internal bearing lockplate 24 such that the internal bearing lockplate 24 remains secured along the interior side 26 of the motor endshield 22.

Figure 18:
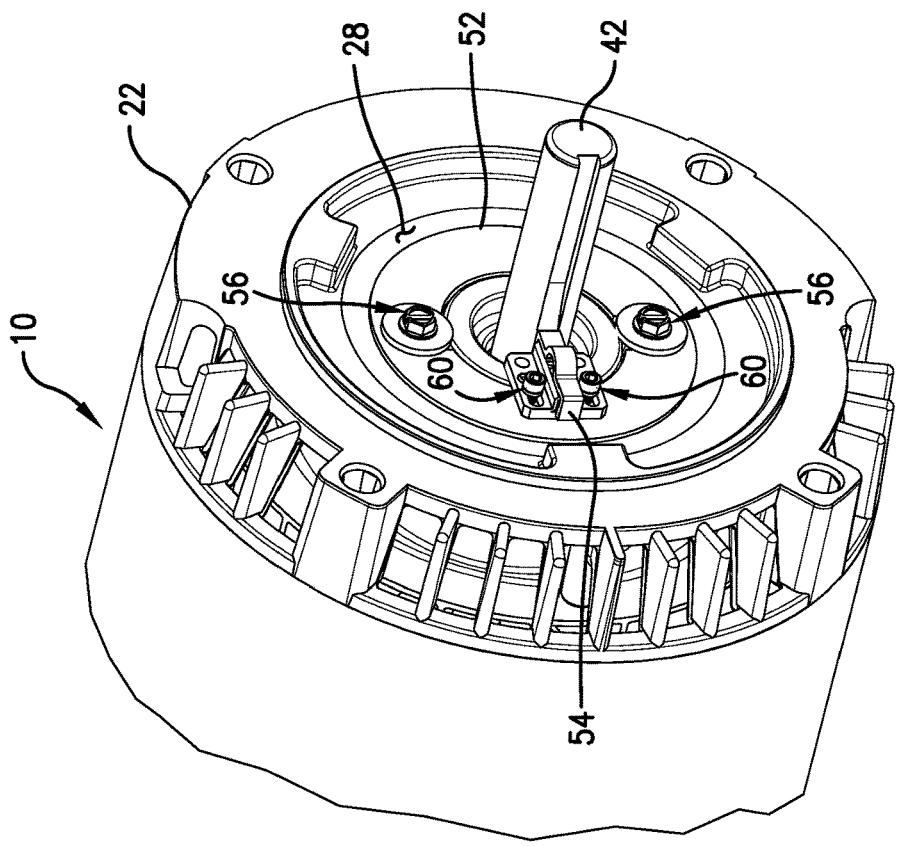
FIG. 18 is a perspective view of the electric motor illustrating the step of coupling a second mounting plate fastener to the electric motor to retain the mounting plate.

Referring to FIG. 18, after the second lockplate fastener 130 is removed, a second mounting plate fastener 56 is coupled to the mounting plate 52, the motor endshield 22, and the bearing lockplate 24 to secure the mounting plate 52 along the exterior side 28 of the endshield 22, and to secure the bearing lockplate 24 along the interior side 26 of the motor endshield 22.

As described above, in some embodiments, the shaft ground 54 is attached to the mounting plate 52 after installation of the mounting plate 52 to the electric motor 10. In such an embodiment, the shaft ground 54 is positioned on the mounting plate 52 such that the conductive element 72 contacts the rotor shaft 42, thereby electrically coupling the shaft ground 54 to the rotor shaft 42. A plurality of shaft ground fastener assemblies 60 are extended through fastener openings (e.g., slots) defined in the shaft ground 54 and threaded into the shaft ground mounting holes 82 of the mounting plate 52.

Referring back to FIG. 8, the shaft ground assembly 100 is coupled to the electric motor 10 without disassembling the electric motor in a similar manner as the shaft ground assembly 50 described above. In particular, as described above referring to FIG. 14, the first lockplate fastener 130 is removed from the motor endshield 22 and the internal bearing lockplate 24. The internal bearing lockplate 24 remains secured in place because the second lockplate fastener 130 has not been removed. The mounting plate 102 is positioned against the endshield 22, aligning the fastener opening 120 with the fastener hole 70 in the endshield 22 and positioning the second plate surface 128 in face to face contact with the exterior side 28 of the motor endshield 22. After the mounting plate 102 is positioned against the motor endshield 22, the first lockplate fastener 130 is replaced with the mounting plate fastener 106, as illustrated in FIG. 8. The first lockplate fastener 130 and the mounting plate fastener 106 each include a threaded fastener shaft. The threaded fastener shaft 110 of the mounting plate fastener 106 is longer than the threaded fastener shaft 132 (shown in FIG. 14) of the first lockplate fastener 130.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

Those of ordinary skill in the art will appreciate that any suitable combination of the previously described embodiments may be made without departing from the spirit of the present invention.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

The invention claimed is:

1. A method of electrically grounding a rotor shaft of an electric motor, said method comprising the steps of:
   (a) removing a first lockplate fastener from a motor endshield and an internal bearing lockplate, while a second lockplate fastener remains coupled to the motor endshield and internal bearing lockplate such that the internal bearing lockplate stays secured along an interior side of the motor endshield;
   (b) positioning a mounting plate of a shaft ground assembly along an exterior side of the motor endshield, the mounting plate supporting a shaft ground, the shaft ground including a conductive element configured to electrically couple to the rotor shaft; and
   (c) replacing the first lockplate fastener with a first mounting plate fastener coupled to the mounting plate, motor endshield, and bearing lockplate to thereby secure the mounting plate along the exterior side of the endshield and secure the bearing lockplate along the interior side of the motor endshield.

2. The method in accordance with claim 1,
   step (a) including the step of unscrewing the first lockplate fastener from a first threaded bore in the bearing lockplate and withdrawing the first lockplate fastener exteriorly from a first fastener hole in the motor endshield.

3. The method in accordance with claim 2,
   step (c) including the steps of inserting the first mounting plate fastener through a first fastener opening in the mounting plate and the first fastener hole and screwing the first mounting plate fastener into the first threaded bore.

4. The method in accordance with claim 3,
   step (b) including the step of aligning the first fastener opening with the first fastener hole,
   step (b) further including the step of receiving the rotor shaft in a shaft opening of the mounting plate.

5. The method in accordance with claim 4,
   step (b) being performed after step (a).

6. The method in accordance with claim 1, further comprising:
   (d) after step (c), removing the second lockplate fastener from the motor endshield and the internal bearing lockplate, while the first mounting plate fastener remains coupled to the motor endshield and internal bearing lockplate such that the internal bearing lockplate stays secured along the interior side of the motor endshield; and
   (e) replacing the second lockplate fastener with a second mounting plate fastener coupled to the mounting plate, motor endshield, and bearing lockplate to thereby secure the mounting plate along the exterior side of the endshield and secure the bearing lockplate along the interior side of the motor endshield.

7. The method in accordance with claim 1, further comprising:
(f) securing the shaft ground to the mounting plate; and
(g) electrically coupling the shaft ground to the rotor shaft.

8. The method in accordance with claim 7,
step (f) being performed before step (b),
step (b) further including the step of receiving the rotor shaft in a shaft opening of the mounting plate, and thereby performing step (g).

9. The method in accordance with claim 7,
steps (f) and (g) being performed after steps (a) through (c).

10. The method in accordance with claim 1,
said first lockplate fastener and said first mounting plate fastener each including a threaded shaft, with the threaded shaft of said first mounting plate fastener being longer than the threaded shaft of the first lockplate fastener,
said first mounting plate fastener including a first mounting plate washer sized to engage the mounting plate.

11. A grounding kit for electrically grounding a rotor shaft of an electric motor, the electric motor having an internal bearing lockplate coupled to an endshield by a removable lockplate fastener, wherein the lockplate fastener extends through a fastener hole defined between interior and exterior sides of the endshield and the lockplate fastener threadably engages the bearing lockplate, said kit comprising:
a mounting plate configured to be secured along the exterior side of the endshield,
said mounting plate including a shaft relief portion and a fastener opening located outboard of the shaft relief portion,
said shaft relief portion being configured to receive the rotor shaft and said fastener opening being configured to align with the fastener hole, when the mounting plate is secured along the exterior side of the endshield;
a shaft ground coupled to said mounting plate,
said shaft ground including a conductive element configured to electrically couple to the rotor shaft when the mounting plate is secured along the exterior side of the endshield; and
a mounting plate fastener comprising a fastener head and a threaded fastener shaft, the mounting plate fastener serving to replace the lockplate fastener, with the fastener shaft received in the fastener opening and the fastener hole and threadably engaged with the bearing lockplate, when the mounting plate is secured along the exterior side of the endshield.

12. The grounding kit in accordance with claim 11,
said mounting plate including a substantially planar first plate surface and an opposite second plate surface,
said second plate surface including at least a partial frusto-conical portion configured to engage the exterior side of the endshield.

13. The grounding kit in accordance with claim 12,
said mounting plate comprising an arcuate body, said arcuate body extending in a semicircular arc having an angle in the range between and including about eighty-five degrees and about ninety-five degrees.

14. The grounding kit in accordance with claim 12,
said fastener head sized to engage said first plate surface when the fastener shaft is received in the fastener opening and the fastener hole and threadably engaged with the bearing lockplate, to thereby secure the mounting plate against the exterior side of the endshield.

15. The grounding kit in accordance with claim 11,
said mounting plate including a plurality of fastener openings spaced about the shaft relief portion.

16. The grounding kit in accordance with claim 11,
said mounting plate fastener including a washer receiving the fastener shaft,
said washer comprising a first washer surface sized to engage the mounting plate and a second washer surface sized to engage the fastener head.

17. The grounding kit in accordance with claim 11,
said fastener opening comprising a slot opened to said shaft relief portion.

18. The grounding kit in accordance with claim 11,
said mounting plate comprising a circumferentially continuous annular body.

19. The grounding kit in accordance with claim 18,
said mounting plate including a plurality of shaft ground mounting holes positioned a predetermined radial distance from said shaft relief portion.

20. The grounding kit in accordance with claim 19,
said shaft ground including a plurality of shaft ground fastener assemblies, each of which includes a threaded ground fastener and a ground washer,
said ground washer being sized to prevent the ground fastener from extending through the mounting plate,
each shaft ground mounting hole receiving a respective shaft ground fastener assembly to fix the shaft ground to the mounting plate.

* * * * *